United States Patent
Lee

(10) Patent No.: US 7,269,341 B2
(45) Date of Patent: Sep. 11, 2007

(54) ADAPTIVE DIGITAL VIDEO RECORDER AND METHOD OF CONTROLLING THE SAME

(75) Inventor: Jae-hoon Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 894 days.

(21) Appl. No.: 10/704,423

(22) Filed: Nov. 7, 2003

(65) Prior Publication Data
US 2004/0096198 A1 May 20, 2004

(30) Foreign Application Priority Data
Nov. 7, 2002 (KR) .................... 10-2002-0068759

(51) Int. Cl.
*H04N 7/26* (2006.01)
(52) U.S. Cl. .................... 386/112; 386/33; 386/109; 386/111
(58) Field of Classification Search .............. 386/33, 386/109, 111–112; 375/240.19
See application file for complete search history.

(56) References Cited

U.S. PATENT DOCUMENTS

| | | | | |
|---|---|---|---|---|
| 5,543,845 A | * | 8/1996 | Asamura et al. | ....... 375/240.02 |
| 6,067,383 A | * | 5/2000 | Taniguchi et al. | .......... 382/240 |
| 2001/0021274 A1 | * | 9/2001 | Lee | ............................ 382/240 |
| 2002/0122600 A1 | * | 9/2002 | Jung et al. | .................. 382/240 |

FOREIGN PATENT DOCUMENTS

KR 2001-0087947 A 9/2001

* cited by examiner

Primary Examiner—Thai Q. Tran
Assistant Examiner—Christopher Findley
(74) Attorney, Agent, or Firm—Drinker Biddle & Reath LLP

(57) ABSTRACT

Provided is a digital video recorder for processing digital video data continuously input in frame units and storing the data on a video storing portion, which includes a wavelet conversion portion to classify digital video data of a present frame by frequency band, a motion area dividing portion to divide the present frame into a high frequency band and a low frequency band according to the digital video data classified by the wavelet conversion portion, a motion detecting portion to generate fractal coefficients from video data in the low frequency band of the present frame, compare the generated fractal coefficients with fractal coefficients of a preceding frame to obtain difference values therebetween, and obtain motion information of the present frame from the difference values, and an adaptive storage control portion to obtain a motion weighted value of the present frame according to the motion information from the motion detecting portion when a storage capacity of the video storing portion is not more than a first set capacity which is less the half of a total capacity of the video storing portion, and store or not the motion information of the present frame in the video storing portion according to the motion weighted value of the present frame.

13 Claims, 9 Drawing Sheets

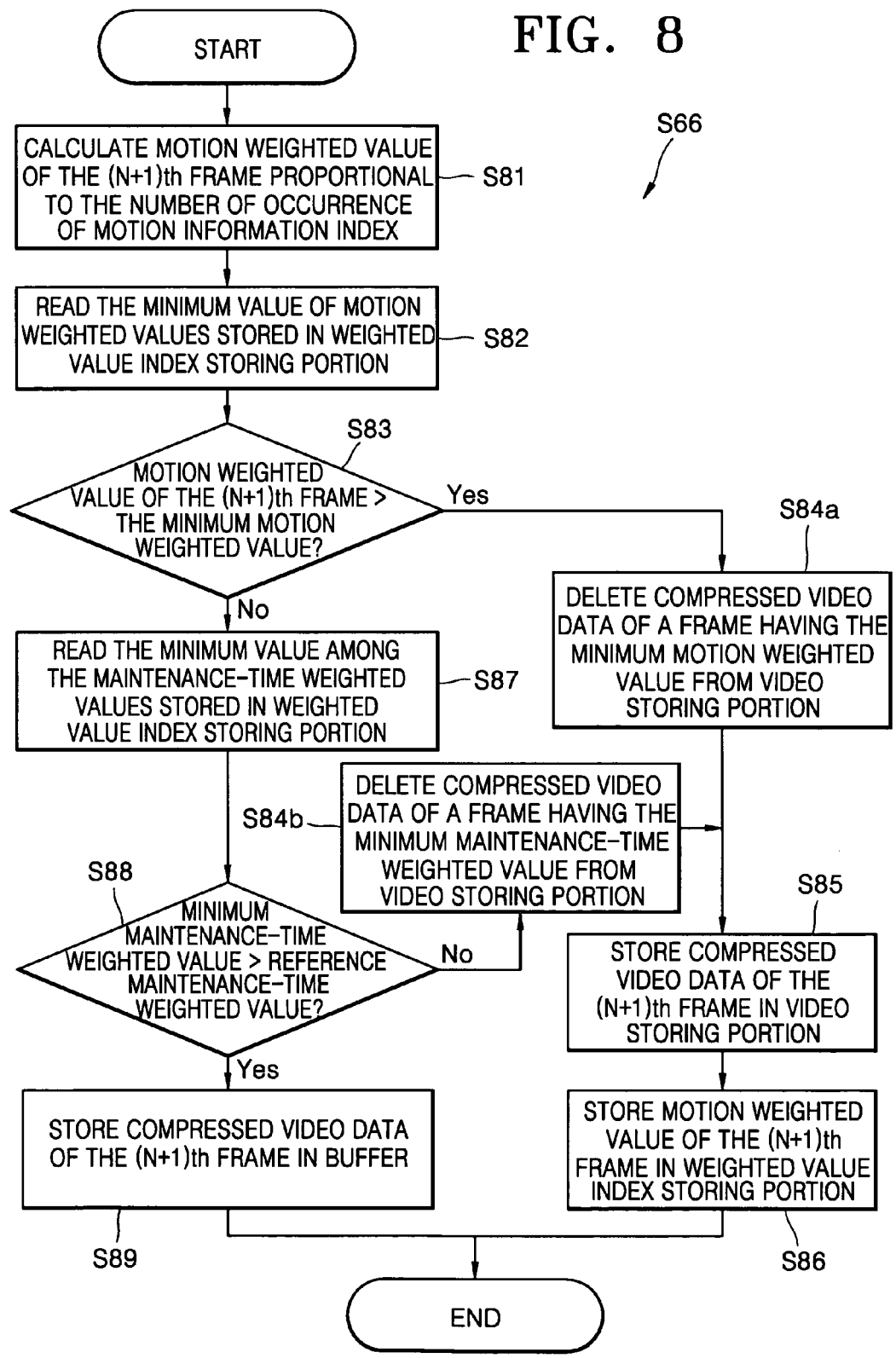

ADAPTIVE DIGITAL VIDEO RECORDER AND METHOD OF CONTROLLING THE SAME

BACKGROUND OF THE INVENTION

This application claims the priority of Korean Patent Application No. 2002-68759 filed on 7 Nov. 2002 in the Korean Intellectual Property Office, the disclosure of which is incorporated herein in its entirety by reference.

1. Field of the Invention

The present invention relates to a digital video recorder and a method of controlling the same, and more particularly, to a digital video recorder which processes digital video data continuously input in the unit of a frame and stores the data on a video storing portion, for example, a hard disk, and a method of controlling the same.

2. Description of the Related Art

Digital video is usually compressed before it is stored in a video storing portion. JPEG (joint photographic coding expert group), MPEG (moving picture expert group), wavelet conversion, and fractal conversion are typical video compression methods. However, these compression methods have a number of problems including the following.

The JPEG and wavelet conversion compression methods are used only for a single frame or a still image, not for a collection of images continuously input in frame units, i.e., a motion picture. Under the JPEG compression method the quality of a restored image deteriorates at a high compression rate. When the MPEG compression method only is used, an excessive encoding time is needed. When the fractal conversion compression method only is used, although the compression time is shortened, a restored image may appear blurred and mashed.

U.S. Pat. No. 6,317,152 discloses an example of a typical digital video recorder. Typical digital video recorders have lacked the capability of performing the management of adaptively storing and deleting a motion picture according to the storage capacity of a video storing portion.

SUMMARY OF THE INVENTION

To solve the above and/or other problems, the present invention provides a digital video recorder which can not only realize a high compression rate in a digital motion picture compression step, reduce an excessive encoding time, and improve the quality of a restored image, but can also perform the management of adaptively storing and deleting a motion picture according to the storage capacity of a video storing portion. The present invention also provides a method of controlling the same.

An aspect of the present invention provides a digital video recorder for processing digital video data continuously input in frame units and storing the data on a video storing portion. The recorder comprises a wavelet conversion portion, a motion area dividing portion, a motion detecting portion, and an adaptive storage control portion. The wavelet conversion portion classifies digital video data of a present frame into frequency bands. The motion area dividing portion divides the present frame into a high frequency band and a low frequency band according to the digital video data classified by the wavelet conversion portion. The motion detecting portion generates fractal coefficients from video data in the low frequency band of the present frame, compares the generated fractal coefficients with fractal coefficients of a preceding frame to obtain difference values therebetween, and obtains motion information of the present frame from the difference values. The adaptive storage control portion obtains a motion weighted value of the present frame according to the motion information from the motion detecting portion when a storage capacity of the video storing portion is not more than a first set capacity which is less than half of the total capacity of the video storing portion. The adaptive storage control portion then either does or does not store the motion information of the present frame in the video storing portion according to the motion weighted value of the present frame.

Another aspect of the present invention provides a method of controlling a digital video recorder for processing digital video data continuously input in the unit of a frame and storing the data on a video storing portion, the method comprising classifying digital video data of a present frame into frequency bands (a wavelet conversion step), dividing the present frame into a high frequency band and a low frequency band according to the digital video data classified in the wavelet conversion step (a motion area dividing step), generating fractal coefficients from video data in the low frequency band of the present frame, comparing the generated fractal coefficients with fractal coefficients of a preceding frame to obtain difference values therebetween, and obtaining motion information of the present frame from the difference values (a motion detection step), and obtaining a motion weighted value of the present frame according to the motion information from the motion detection step when a storage capacity of the video storing portion is not more than a first set capacity which is less the half of a total capacity of the video storing portion, and storing or not the motion information of the present frame in the video storing portion according to the motion weighted value of the present frame (an adaptive storage control step).

BRIEF DESCRIPTION OF THE DRAWINGS

The above and other features and advantages of the present invention will become more apparent by describing in detail preferred embodiments thereof with reference to the attached drawings in which:

FIG. 8 is a flow chart for explaining the algorithm of the second adaptive storage control step of FIG. 6.

DETAILED DESCRIPTION OF THE INVENTION

Figure 1:
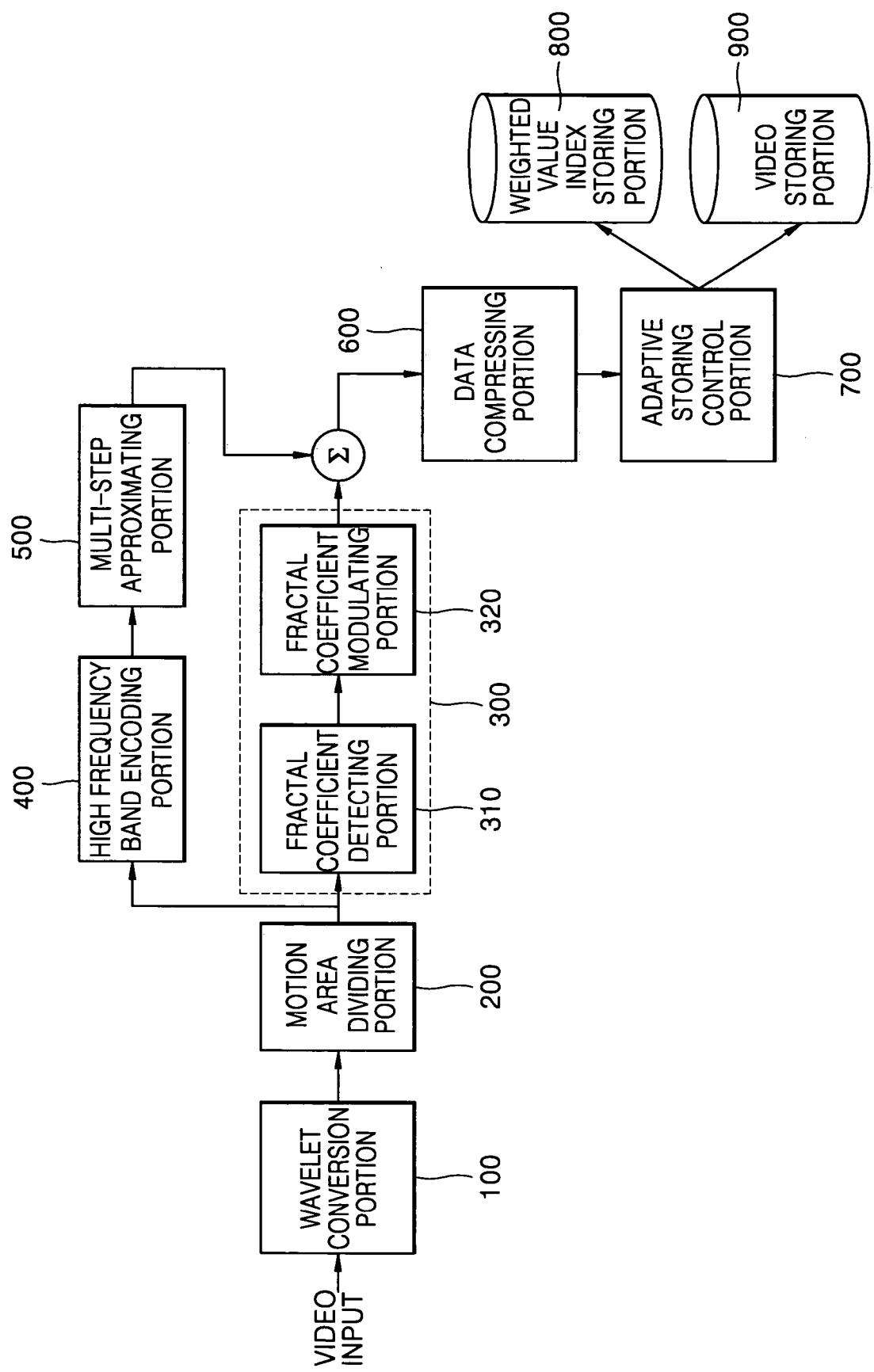
FIG. 1 is a block diagram showing the configuration of a digital video recorder according to a preferred embodiment of the present invention.

Referring to FIG. 1, a digital video recorder according to a preferred embodiment of the present invention processes digital video data continuously input in frame units and stores the processed data in an video storing portion 900. The digital video recorder includes a wavelet conversion portion 100, a motion area dividing potion 200, a motion detecting portion 300, a high frequency band encoding portion 400, a multi-step approximating portion 500, a data compressing portion 600, an adaptive storage control portion 700, and a weighted value index storing portion 800.

The wavelet conversion portion 100 classifies digital video data of the present frame by frequency band. The motion area dividing portion 200 divides the present frame into a high frequency band and a low frequency band according to the digital video data classified by the wavelet conversion portion 100. The motion area detecting portion 300 includes a fractal coefficient detecting portion 310 and a fractal coefficient modulating portion 320. The motion area detecting portion 300 compares fractal coefficients of video data in the lower frequency band of the present frame with fractal coefficients of the preceding frame to obtain difference values, by using a DPCM (differential pulse code modulation) method as well as motion information, and obtains motion information of the present frame from the difference values.

The high frequency band encoding portion 400 encodes video data in the high frequency band of the present frame. The multi-step approximating portion 500 segments the video data from the high frequency band encoding portion 400 by frequency band step by step and obtains information on changes during the dividing process to provide the information to the data compressing portion 600. The data compressing portion 600 compresses the motion information of the present frame output from the motion detecting portion 300 and the information on changes output from the multi-step approximating portion 500. The data compressing portion 600 provides the compressed information to the adaptive storage control portion 700.

The adaptive storage control portion 700 obtains a motion weighted value of the present frame according to the motion information from the motion detecting portion 300 when a storage capacity of the video storing portion 900 is not more than a first set capacity. This first set capacity is less than the total capacity of the video storing portion 900. The adaptive storage control portion 700 stores the motion information of the present frame and the information on changes in the video storing portion 900 according to the motion weighted value of the present frame. When the motion information of the present frame and the information on changes are stored in the video storing portion 900, the adaptive storage control portion 700 stores the motion weighted value of the present frame in the weighted value index storing portion 800. Also, the weighted value index storing portion 800 continuously updates maintenance time of the motion weighted value of each frame, that is, maintenance-time weighted values proportional to maintenance time of the video storing portion 900 with respect to the respective frames stored in the video storing portion 900. The maintenance-time weighted values for the respective frames act as determination factors of the adaptive storage control portion 700 together with the motion weighted values for the respective frames. The algorithm of the adaptive storage control portion 700 is described below in detail with reference to FIGS. 6 through 8.

According to the digital video recorder according to the present invention, the motion information of the present frame with respect to the preceding frame only can be stored by means of the wavelet conversion, the motion area division, and the motion detection. This is because an image of each frame can be restored by tracing relationships between the motion information and the preceding frame. Accordingly, improved quality of a restored image can be obtained at a high compression rate in a reduced encoding time. Moreover, by the adaptive storage control, an adaptive management of storing and deleting of a motion picture according to the storage capacity of the video storing portion can be performed.

Figure 2:
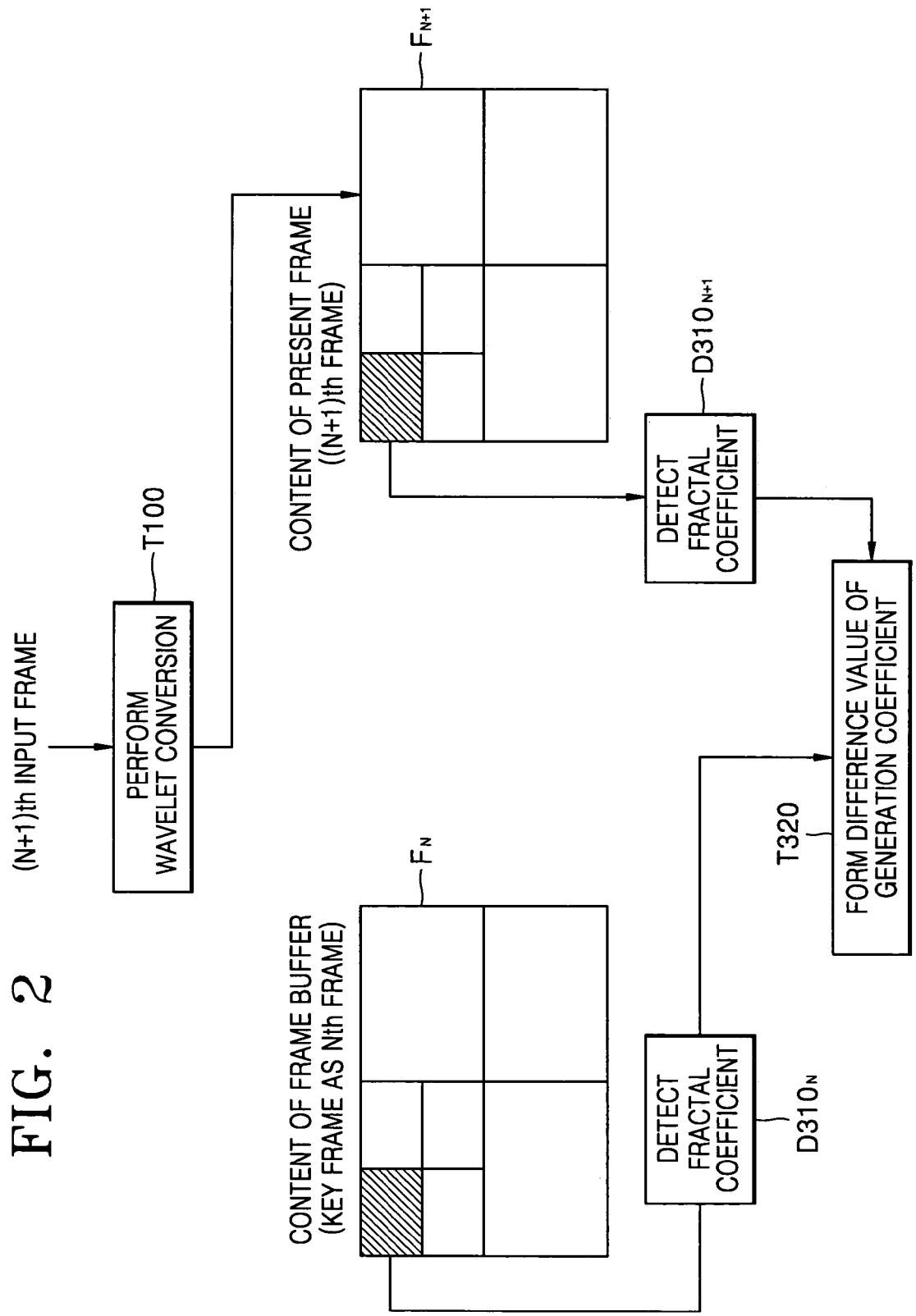
FIG. 2 is a view illustrating the frame processing operation of a wavelet conversion portion, a motion area dividing portion, and a motion detecting portion of the digital video recorder of FIG. 1.

Referring to FIGS. 1 and 2, the frame processing operation of the wavelet conversion portion 100, the motion area dividing portion 200, and the motion detecting portion 300 of the digital video recorder of FIG. 1 is described as follows.

The (N+1)th frame $F_{N+1}$ is the present frame and is classified into frequency bands by a wavelet conversion method (T100). The (N+1)th frame $F_{N+1}$ is classified by the motion area division into a high frequency band (a non-shaded area) and a low frequency band (a shaded area). Because most motion occurs in the low frequency band (the shaded area), fractal coefficients as motion information are detected in the low frequency band (the shaded area) as the motion area (Step D310$_{N+1}$). The detected fractal coefficients are compared to the fractal coefficients detected in a key frame FN, which is the preceding frame (Step D310$_{N+1}$), to form difference values of generation coefficients (Step T320).

Figure 3:
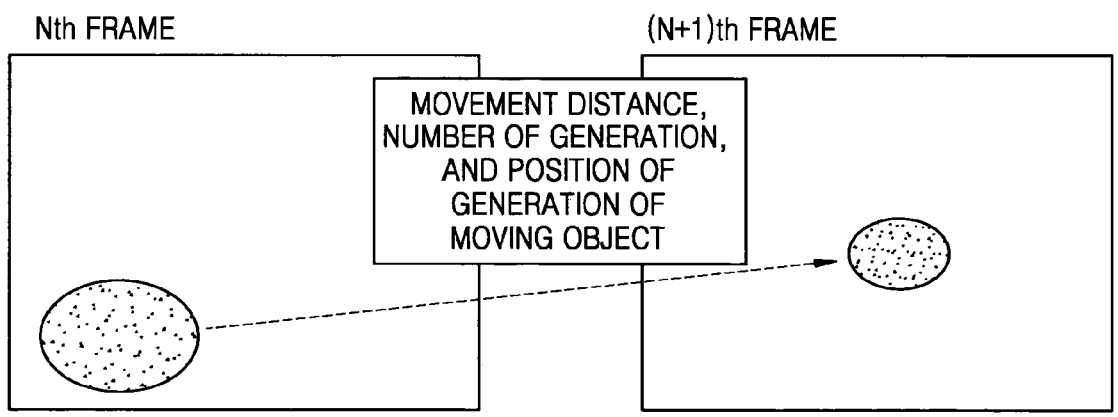
FIG. 3 is a view illustrating a method of generating motion information by the motion detecting portion of the digital video recorder of FIG. 1.

Referring to FIGS. 2 and 3, when a moving object is detected at the (N+1)th frame $F_{N+1}$, the present frame, motion information of the (N+1)th frame $F_{N+1}$ is generated by comparing the fractal coefficients of the (N+1)th frame $F_{N+1}$ with the fractal coefficients of the key frame $F_N$, the preceding frame. The motion information includes a movement distance (which is the difference between the position of the object at the key frame $F_N$, the preceding frame, and the position of the object at the (N+1)th frame $F_{N+1}$, the present frame), the number of occurrence (proportional to the number of frames wherein the object is continuously placed on a position), and the position of the object of the (N+1)th frame $F_{N+1}$, the present frame.

Figure 4:
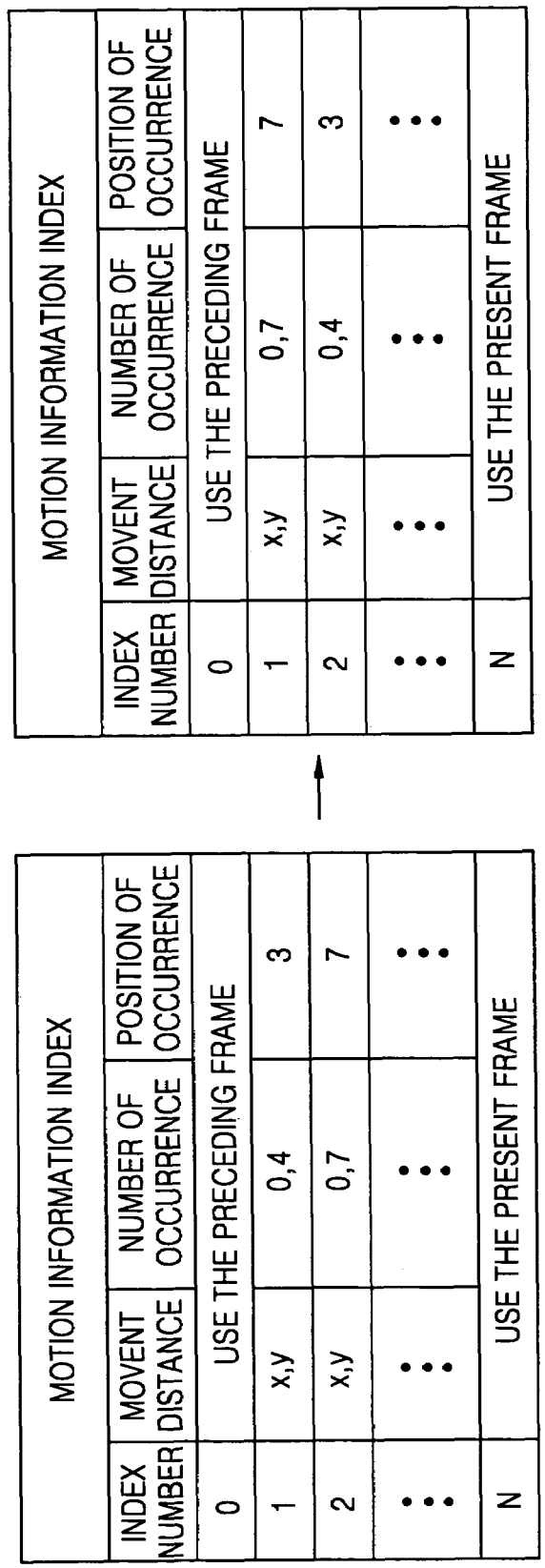
FIG. 4 is a view showing a method of arranging motion information indexes generated by the motion detecting portion of the digital video recorder of FIG. 1.

Referring to FIG. 4, the motion information index includes information such as an index number, the movement distance, the number of occurrence, and the generation position (the position of the object of the (N+1)th frame $F_{N+1}$, the present frame). The first index number "0" has information indicating that the key frame, the preceding frame, is used as it is. The last index number "N" has information indicating that video data of the present frame is used. Each of the remaining index numbers from "1" to "N−1" has information such as the index number, the movement distance, the number of occurrence, and the position of generation. The information of a frame having a relatively high generation number is rearranged to have an earlier index number. Accordingly, whether the motion information of the present frame exists in the motion information can be quickly determined by detecting the motion information from an earlier index number.

Figure 5A:
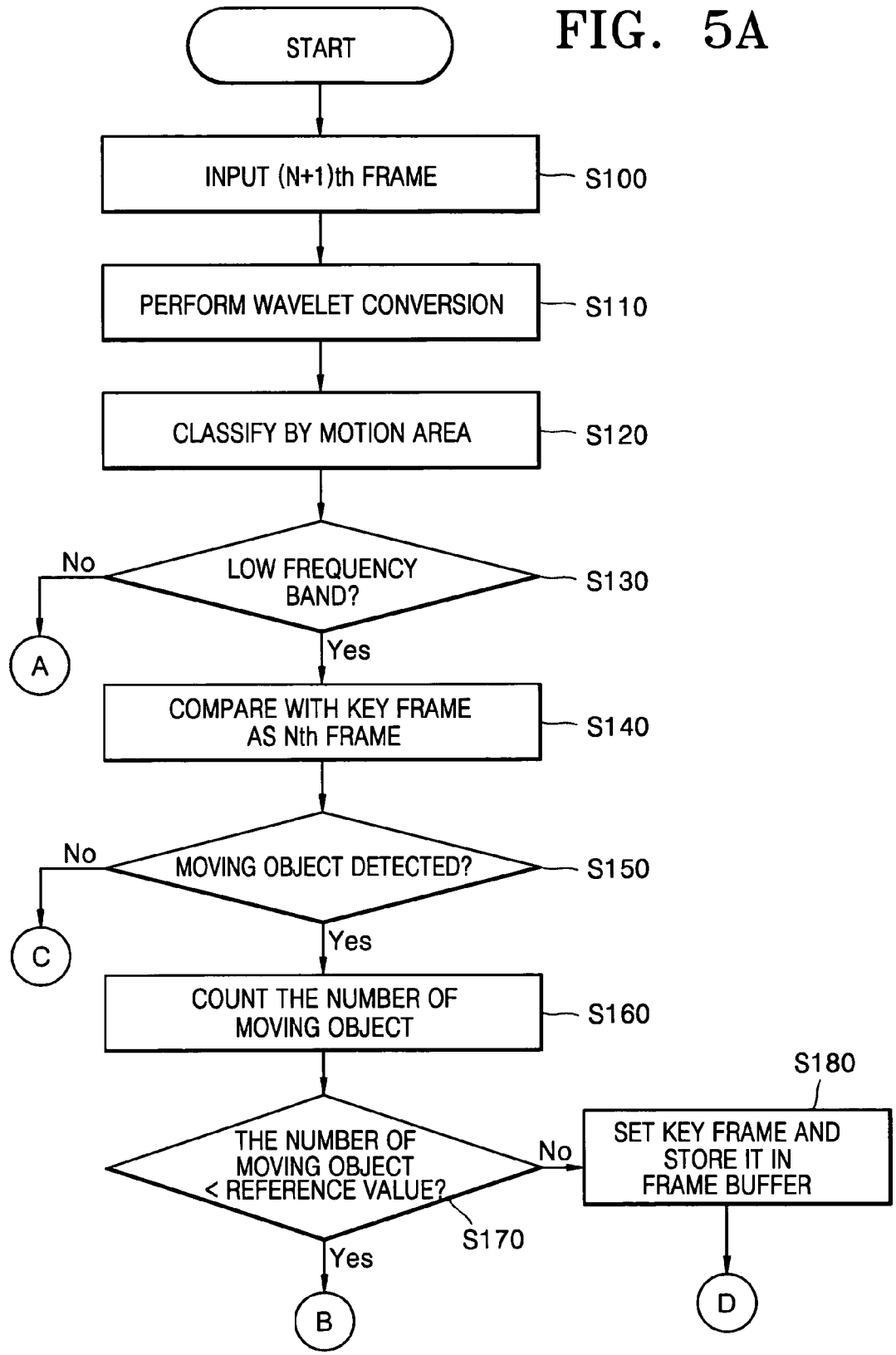
FIGS. 5A through 5B are flow charts for explaining a data processing method of the digital video recorder of FIG. 1.
Figure 5B:
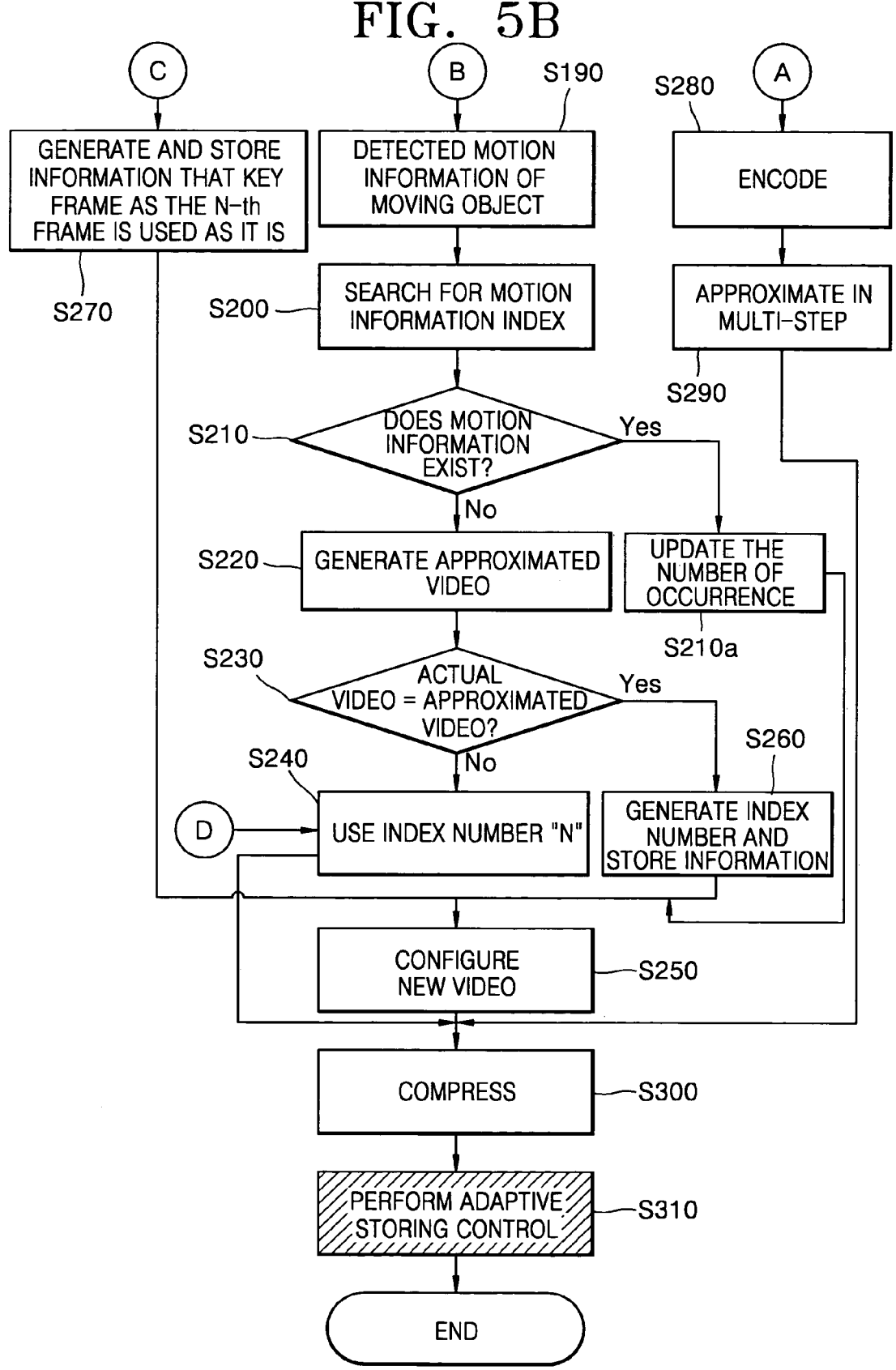

Referring to FIGS. 5A through 5B, a data processing method with respect to the (N+1)th frame as the present frame is described below.

When the (N+1)th frame is input as the present frame (S100), digital video data of the (N+1)th frame is classified into frequency bands by the wavelet conversion (S110). Next, the (N+1)th frame is classified into a high frequency band and a low frequency band by the motion area division (S120). When the (N+1)th frame has the low frequency band (S130), the determination of whether the moving object is detected is made by comparing the (N+1)th frame and the key frame as the N-th frame, the preceding frame (S150).

When the moving object is detected, the number of moving objects is counted (S160). When the number of moving objects is over a predetermined value (S170), the (N+1)th frame as the present frame is set as the key frame and stored in a key frame buffer (S180). In this case, the index number is set to "N" (S240) and the (N+1)th frame as the present frame is compressed (S300) to be adaptively stored (S310). The algorithm of the adaptive storage control step (S310) will be detailed in the following description with reference to FIGS. 6 thorough 8.

If the number of moving objects is less than a predetermined value, the motion information on the moving objects of the (N+1)th frame is detected by comparing the fractal coefficient of the key frame and the fractal coefficient of the (N+1)th frame (S190). Next, the motion information of Step S190 is searched for in the motion information index (S200).

After the search, if the motion information of Step S190 exists in the motion information index, the number of the generation of the index information is updated in the index information index (Step S210). Also, corresponding index information is configured as a substituted video (Step S250), which is then compressed (Step S300) and adaptively stored (Step S310).

After the search, if the motion information of Step S190 does not exist in the motion information index (Step 210), an approximated video is generated by a fractal approximation method to determine an error in the motion information of the (N+1)th frame (S220). Next, if an actual video and the approximated video do not match (Step 230), since there is an error in the motion information of the (N+1)th frame, the index number is set to "N" (S240). The (N+1)th frame as the present frame is compressed (S300) and is adaptively stored (Step 310). If the actual video and the approximated video are the same (S230), since there is no error in the motion information of the (N+1)th frame, an index number is generated and the motion information is stored in the motion information index (S260). Also, a substituted video, that is, corresponding index information, is configured (Step S250), compressed (Step S300), and adaptively stored (Step S310).

When the (N+1)th frame as the present frame does not have a low frequency band in Step S130, the video data in the high frequency band of the (N+1)th frame is encoded (S280). While the encoded video data is divided step by step by frequency band, information on changes is obtained (S290). The change information is compressed (S300) and is adaptively stored (S310).

When a moving object is not detected in Step S150, the index number is set to "0" (S270) and the key frame as the N-th frame that is the preceding frame is used as the (N+1)th frame, the present frame. Accordingly, a substituted video, that is, a corresponding index information "0", is configured (S250), compressed (S300), and adaptively stored (S310).

Figure 6:
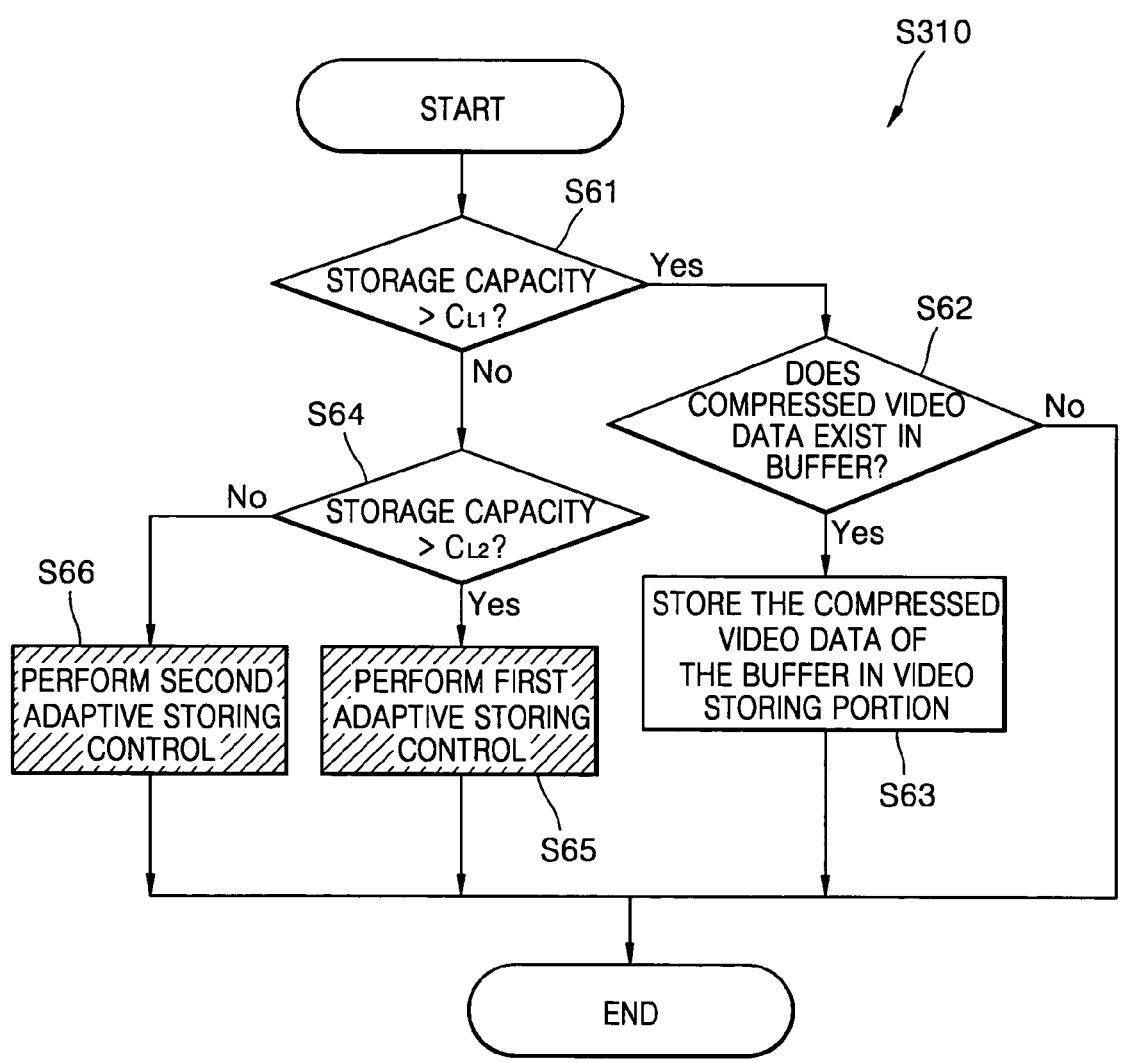
FIG. 6 is a flow chart for explaining the algorithm of an adaptive storage control step.

Referring to FIGS. 1 and 6, the algorithm of the adaptive storage control step S310 of FIG. 5B to the (N+1)th frame as the present frame is described below.

Figure 7:
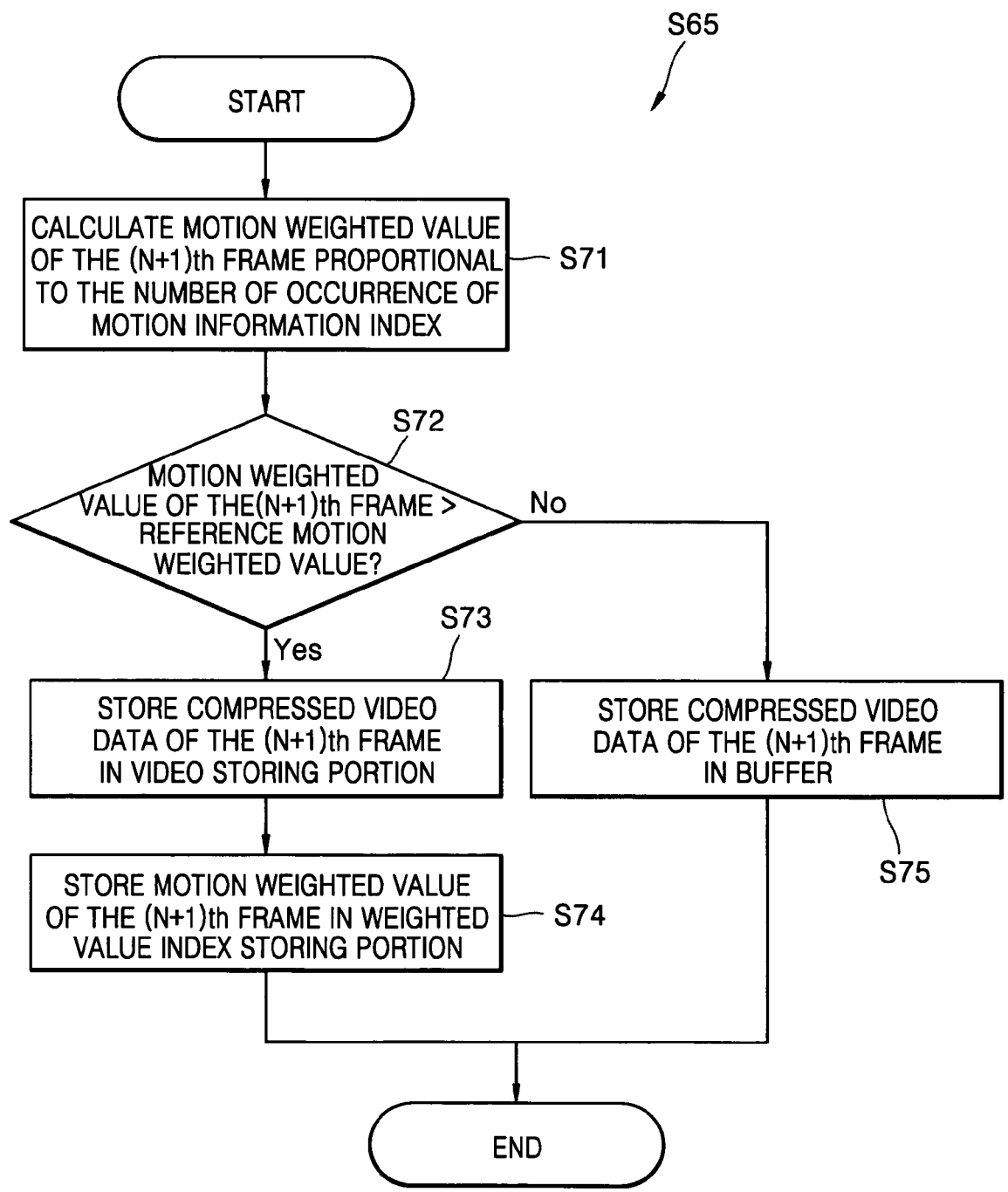
FIG. 7 is a flow chart for explaining the algorithm of the first adaptive storage control step of FIG. 6.

When the storage capacity of the video storing portion 900 is not more than a first set capacity $C_{L1}$ which is less than half of the total capacity (S61), the storage capacity is compared to a second set capacity $C_{L2}$ which is less than the first set capacity $C_{L1}$ (S64). When the storage capacity is greater than the second set capacity $C_{L2}$, a first adaptive storage control step of FIG. 7 is performed (S65). Otherwise, for example, when the storage capacity of the video storing portion 900 is too small, a second adaptive storage control step of FIG. 8 is performed (S66). During the first and second adaptive storage control steps S65 and S66, when the compressed data of the (N+1)th frame as the present frame is not stored in the video storing portion 900, the compressed data is stored in a particular buffer (not shown).

When the storage capacity of the video storing portion 900 is greater than the first set capacity $C_{L1}$ which is less than the half of the total capacity of the video storing portion 900 (S61), whether compressed video data exists in the buffer is determined (S62). When the compressed video data exists in the buffer, the compressed video data of the buffer is stored in the video storing portion 900 (S63).

Referring to FIGS. 1 and 7, the algorithm of the first adaptive control step S65 of FIG. 6 is described below.

First, a motion weighted value of the (N+1)th frame proportional to the number of occurrence of the motion information index is calculated (S71). Next, when the motion weighted value of the (N+1)th frame is greater than a reference motion weighted value (S72), the compressed video data of the (N+1)th frame is stored in the video storing portion 900 (S73) and the motion weighted value of the (N+1)th frame is stored in the weighted value index storing portion 800 (S74).

However, when the motion weighted value of the (N+1)th frame is not more than the reference motion weighted value (S72), the compressed video data of the (N+1)th frame is stored not in the video storing portion 900, but in the buffer (S75).

Referring to FIGS. 1 and 8, the algorithm of the second adaptive control step S66 of FIG. 6 is described below.

First, the motion weighted value of the (N+1)th frame proportional to the number of occurrence of the motion information index is calculated (S81). The minimum value among the motion weighted values stored in the weighted value index storing portion 800 is read (S82). The motion weighted value of the (N+1)th frame and the minimum motion weighted value are compared to each other (S83).

When the motion weighted value of the (N+1)th frame is determined to be greater than the minimum motion weighted value in the comparison step S83, the compressed video data of a frame having the minimum motion weighted value is deleted from the video storing portion 900 (S84a), the compressed video data of the (N+1)th frame is stored in the video storing portion 900 (S85), and the motion weighted value of the (N+1)th frame is stored in the weighted value index storing portion 800 (S86).

When the motion weighted value of the (N+1)th frame is determined to be not more than the minimum motion weighted value in the comparison step S83, the minimum value among the maintenance-time weighted values stored in the weighed value index storing portion 800 is read (S87). Next, the minimum maintenance-time weighted value and the reference maintenance-time weighted value are compared to each other (S88). When the maintenance-time weighted value is not more than the reference maintenance-time weighted value, the compressed video data of a frame having the minimum maintenance-time weighted value is deleted from the video storing portion 900 (S84b), the compressed video data of the (N+1)th frame is stored in the video storing portion 900 (S85), and the motion weighted value of the (N+1)th frame is stored in the weighted value index storing portion 800 (S86). However, when the maintenance-time weighted value is greater than the reference maintenance-time weighted value, the compressed video data of the (N+1)th frame is stored not in the video storing portion 900, but in the buffer (S89).

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital video recorder for processing digital video data continuously input in frame units and storing the data on a video storing portion, the recorder comprising:
 a wavelet conversion portion to classify digital video data of a present frame by frequency band;
 a motion area dividing portion to divide the present frame into a high frequency band and a low frequency band according to the digital video data classified by the wavelet conversion portion;
 a motion detecting portion to generate fractal coefficients from video data in the low frequency band of the present frame, compare the generated fractal coefficients with fractal coefficients of a preceding frame to obtain difference values therebetween, and obtain motion information of the present frame from the difference values; and
 an adaptive storage control portion to obtain a motion weighted value of the present frame according to the motion information from the motion detecting portion when a storage capacity of the video storing portion is not more than a first set capacity which is less the half of a total capacity of the video storing portion, and store or not the motion information of the present frame in the video storing portion according to the motion weighted value of the present frame.

2. The digital video recorder as claimed in claim 1, wherein the motion information includes
 a movement distance that is the difference between the position of an object of the preceding frame and the position of the object of the present frame,
 the number of occurrence proportional to the number of frames where the object is placed continuously at the position of the object of the present frame, and
 the position of the object of the present frame.

3. The digital video recorder as claimed in claim 2, wherein the motion weighted value is proportional to the number of occurrence included in the motion information obtained by the motion detecting portion.

4. The digital video recorder as claimed in claim 1, further comprising:
 a high frequency band encoding portion encoding video data in a high frequency band of the present frame; and
 a multi-step approximating portion dividing the video data from the high frequency band encoding portion by frequency band step by step and obtaining information on changes in a division process and providing the obtained change information to the adaptive storage control portion.

5. The digital video recorder as claimed in claim 4, further comprising a data compressing portion compressing the motion information of the present frame from the motion detecting portion and the change information from the multi-step approximating portion and providing the compressed information to the adaptive storage control portion.

6. A method of controlling a digital video recorder for processing digital video data continuously input in frame units and storing the data on a video storing portion, the method comprising:
 a wavelet conversion step of classifying digital video data of a present frame by frequency band;
 a motion area dividing step of dividing the present frame into a high frequency band and a low frequency band according to the digital video data classified in the wavelet conversion step;
 a motion detection step of generating fractal coefficients from video data in the low frequency band of the present frame, comparing the generated fractal coefficients with fractal coefficients of a preceding frame to obtain difference values therebetween, and obtaining motion information of the present frame from the difference values; and
 an adaptive storage control step of obtaining a motion weighted value of the present frame according to the motion information from the motion detection step when a storage capacity of the video storing portion is not more than a first set capacity which is less than half of a total capacity of the video storing portion, and storing or not the motion information of the present frame in the video storing portion according to the motion weighted value of the present frame.

7. The method as claimed in claim 6, wherein, in the motion detection step, the motion information includes a movement distance, the number of occurrence, and the position of the object of the present frame.

8. The method as claimed in claim 7, wherein, in the adaptive storage control step, the motion weighted value is proportional to the number of occurrence included in the motion information obtained by the motion detecting portion.

9. The method as claimed in claim 6, further comprising:
 encoding video data in the high frequency band of the present frame (a high frequency band encoding step); and
 dividing the video data from the high frequency band encoding portion by frequency band step by step and obtaining information on changes in a division process and providing the obtained change information to the adaptive storage control step (a multi-step approximating step).

10. The method as claimed in claim 9, further comprising compressing the motion information of the present frame from the motion detecting portion and the change information from the multi-step approximating portion and providing the compressed information to the adaptive storage control step (a data compressing step).

11. The method as claimed in claim 6, wherein, in the adaptive storing control step, after the motion information of a frame is stored in a buffer, when a storage capacity of the video storing portion is greater than the first set capacity by the deleting operation of a user, the motion information of a frame stored in the buffer is stored in the video storing portion.

12. The method as claimed in claim 6, wherein the adaptive storing control step comprises:
 comparing the minimum motion weighted value of motion weighted values of frames stored in the video storing portion with a motion weighted value of the present frame if the storage capacity of the video storing portion is not more than the second set capacity which is less than the first set capacity (a comparison step);
 deleting the motion information of a frame having the minimum motion weighted value from the video storing portion if the motion weighted value of the present frame is greater than the minimum motion weighted value (a deletion step); and storing the motion information of the present frame in the video storing portion.

13. The method as claimed in claim 12, wherein maintenance-time weighted values proportional to maintenance time of the video storing portion with respect to each of the frames stored in the video storing portion is continuously updated, and the adaptive storing control step further comprises:

comparing the minimum maintenance-time weighted value of maintenance-time weighted values of the frames stored in the video storing portion with a reference maintenance-time weighted value if the minimum motion weighted value is greater than the motion weighted value of the present frame in the comparison step;

deleting the motion information of a frame having the minimum maintenance-time weighted value from the video storing portion if the minimum maintenance-time weighted value is not more than the reference maintenance-time weighted value; and storing the motion information of the present frame in the video storing portion.

\* \* \* \* \*